United States Patent
Flautt et al.

(10) Patent No.: US 6,270,897 B1
(45) Date of Patent: Aug. 7, 2001

(54) COUPLING-AGENT SYSTEM FOR COMPOSITE FIBERS

(75) Inventors: Martin Charles Flautt, Granville; Leonard J. Adzima, Pickerington, both of OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/354,747

(22) Filed: Jul. 29, 1999

(51) Int. Cl.[7] ............................... B32B 25/20; C08K 3/34
(52) U.S. Cl. ..................... 428/391; 428/378; 428/375; 428/392; 106/287.12; 106/287.13; 106/287.16; 524/492
(58) Field of Search ............... 106/287.12, 287.13, 106/287.16; 428/375, 391, 392, 378; 524/492

(56) References Cited

U.S. PATENT DOCUMENTS

| | | |
|---|---|---|
| 3,252,825 | 5/1966 | Marzocchi . |
| 3,773,546 | 11/1973 | Marzocchi . |
| 4,049,873 * | 9/1977 | Creasey et al. ................ 428/447 |
| 4,394,418 | 7/1983 | Temple . |
| 4,446,259 | 5/1984 | Vasta . |
| 4,448,910 | 5/1984 | Haines et al. . |
| 4,500,600 * | 2/1985 | Wong et al. ................... 428/391 |
| 4,786,667 | 11/1988 | Shimizu et al. . |
| 4,786,669 | 11/1988 | Dewhirst . |
| 5,049,627 | 9/1991 | Edelman . |
| 5,063,260 | 11/1991 | Chen et al. . |
| 5,232,959 | 8/1993 | Togashi et al. . |
| 5,280,053 | 1/1994 | Dearlove et al. . |
| 5,417,869 | 5/1995 | Mikami et al. . |
| 5,457,167 | 10/1995 | Higaki et al. . |
| 5,550,184 * | 8/1996 | Halling ........................... 524/837 |
| 5,552,476 * | 9/1996 | Halling ........................... 524/837 |
| 5,661,200 * | 8/1997 | Boudreaux, Jr. et al. ...... 523/436 |
| 5,766,322 * | 6/1998 | Leiser et al. ......................... 106/2 |
| 6,030,444 * | 2/2000 | Couttenier ................. 106/287.13 |

* cited by examiner

Primary Examiner—Cynthia H. Kelly
Assistant Examiner—J. Gray
(74) Attorney, Agent, or Firm—Inger H. Eckert

(57) ABSTRACT

An aqueous glass fiber sizing composition comprising at least one diol-organosilane coupling agent and at least one triol-organosilane coupling agent.

14 Claims, No Drawings

COUPLING-AGENT SYSTEM FOR COMPOSITE FIBERS

TECHNICAL FIELD AND INDUSTRIAL APPLICABILITY OF THE INVENTION

The present invention relates to glass fibers used in the manufacture of glass fiber reinforced composite structures. More particularly, the present invention relates to an aqueous sizing composition for application to the glass fibers to reduce interfilament abrasion during formation, and to improve compatibility of the fibers with the matrix material of the composite structure.

BACKGROUND OF THE INVENTION

In the manufacture of glass fiber reinforced polymeric composites, many of the properties of the composites are directly attributable to the properties of the glass fiber reinforcement. Accordingly, anything that deleteriously affects the desired physical properties of the glass fibers, such as abrasion of the fibers during their processing, is desirably avoided. Moreover, the degree to which the composite benefits from the inclusion of the glass fibers is largely dependent on the chemical coupling that occurs at the fiber polymer interface. For these reasons, glass fibers intended to be used as reinforcing elements in articles fabricated from polymeric or resinous materials are usually provided with a light-weight size coating to protect the fibers from damage by abrasion during processing and fabrication, and/or to enhance the reinforcing interaction between the fibers and the matrix material. Such size coatings typically comprise a film-forming polymeric or resinous component, a lubricant to reduce interfilament abrasion, and a glass-resin coupling agent, such as a partially hydrolizable organosilane or hydrozylate thereof.

Such size coatings are usually deposited on the glass fibers during their production, which is ordinarily by attenuation of a plurality of streams of molten glass issuing from a reservoir through a corresponding plurality of orifices in a bushing, and solidification of the attenuated filaments by cooling. The coating is typically applied to the fibers as a liquid solution or dispersion in a volatile medium, from which the ultimate size coating is deposited on the fibers by evaporation of the medium and any other volatile components. Evaporation of the liquid medium may occur either before or after the fibers have been collected into a package, as by winding onto a suitable collet, or chopped into discrete lengths.

While a number of organosilanes, or hydrozylates thereof, either alone or in various mixtures, have been employed as coupling agents in such sizing compositions, the advantages provided by the particular mixture of organosilanes in the sizing composition of the present invention have not heretofore been appreciated in the art.

SUMMARY OF THE INVENTION

The present invention provides an aqueous sizing composition for glass fibers utilized in the reinforcement of polymeric composites. In particular, the present invention provides an aqueous sizing composition formed by combining at least one diester-organosilane coupling agent and at least one triester-organosilane coupling agent with water, which, after hydrolysis, provides a sizing composition comprising at least one diol-organosilane hydrozylate and at least one triol-organosilane hydrozylate. It has been discovered that the combination of these coupling agents in the sizing composition provides enhanced physical properties to composite articles reinforced with glass fibers coated therewith.

DETAILED DESCRIPTION AND PREFERRED EMBODIMENTS OF THE INVENTION

The sizing composition of the present invention provides sized glass fibers for use as reinforcement in polymeric articles which, in turn, provide the resulting composite with enhanced physical properties. The sizing composition, and the sized glass fiber strands of the present invention, can be used for any reinforcement application, but are preferably used to reinforce epoxy composites. The glass fiber coated with the sizing composition of the present invention can be of any conventional form, for example, chopped or continuous strand, roving, woven glass fiber strand and the like, but continuous strand is generally preferred.

The glass fibers can be prepared and coated with the sizing composition by any conventional method suitable for producing such fibers. For example, suitable fibers can be formed by attenuating molten glass into filaments through orifices in a bushing and the fibers coated with the sizing composition by spraying or roll coating as is well known in the fiber-making art.

The aqueous sizing composition of the present invention comprises a combination of at least one diol organosilane and at least one triol-organosilane. Additionally, the sizing composition may contain other commonly included components such as film-forming polymeric materials and lubricants. The film-forming polymers must be compatible with the polymeric matrix to be reinforced, and, in combination with the other components of the sizing composition, impart good processing characteristics and matrix compatibility to the glass fiber strand. Suitable film-forming materials include epoxy, vinyl ester, polyester, vinylacetate, polyurethane and acrylic polymer resins. However, low molecular weight epoxy resins are generally preferred. Preferably such resins have an epoxy equivalent weight of from about 175 to about 275, more preferably, from about 230 to about 250.

Any conventional glass fiber lubricant compatible with the film-forming material and matrix resin can be used in the sizing compositions of the invention. For example, suitable lubricants include nonionic lubricants, such as polyethylene glycol esters (e.g., PEG 400 Monooleate), and cationic lubricants, such as polyethylene imine alkylamides (e.g., EMERY 6760u lubricant, commercially available from Henkel, Inc.).

In addition to any filmformer and lubricant, the sizing compositions of the invention contain the hydrozylates of at least two silane coupling agents, one of which is a triester-organosilane of the formula $R^1$—$Si(OR^2)_3$, wherein $R^1$ is selected from a phenyl group or a saturated or unsaturated alkyl group having from 1 to 10 carbon atoms, optionally substituted with a halide, methacryloxy, cycloalkylepoxy, epoxy ester, mercapto, amino, ureido or carbamate moiety; and $R^2$ is selected from a methyl, ethyl, 2-methoxy-ethyl, isopropyl, n-propyl or n-butyl moiety; and one of which is a diester-organosilane of the formula $R^3$—$Si(CH_3)(OR^4)_2$, wherein $R^3$ can be independently selected from the same group of moieties as $R^1$, and $R^4$ can be independently selected from the same group of moieties as $R^2$. Preferably, $R^1$ and $R^3$ are independently selected from methyl, vinyl, chloropropyl, phenyl, methacrylyloxy-propyl, beta-(3, 4epoxycyclohexyl)ethyl, glycidoxy propyl, mercaptopropyl, aminopropyl, N-beta-(aminoethyl) aminopropyl, mercaptoethyl, n-Octyl, $(HOC_2H_4)_2NH(CH_2)_3$, $H_2NCONH$ $(CH_2)_3$, $H_2N(CH_2)_2NH(CH_2)_2NH(CH_2)_3$ and $C_2H_5OCONHCH_2CH_2CH_2$; and $R^2$ and $R^4$ are independently selected from methyl and ethyl moieties. Suitable triester-organosilanes include the following compounds commercially available from OSi Specialties of Tarrytown, N.Y., and suitable diester-organosilanes include modified versions of the specified triester organosilanes, wherein one of the ester functionalities has been replaced with a methyl group.

Although the exact reason why the blend of diol and triol organosilanes improve performance in the resulting composites is not completely understood, it is believed that the blend optimizes the polymeric silane interphase layer between the composite matrix material and the glass fibers. In particular, if only the triolsilane is used, the high cross-link density that results may result in the layer being too brittle such that it can crack and fail. On the other hand, the diol-silanes may produce a layer that is insufficiently cross-

TABLE A

| Trade Designation | Nomenclature | Formula |
| --- | --- | --- |
| A-143 | gamma-Chloropropyl-trimethoxysilane | $ClCH_2CH_2CH_2Si(OCH_3)_3$ |
| A-151 | Vinyltriethoxysilane | $CH_2{=}CHSi(OCH_2CH_3)_3$ |
| A-153 | Phenyltriethoxysilane | $C_6H_5Si(OCH_2CH_3)_3$ |
| A-162 | Methyltriethoxysilane | $CH_3Si(OCH_2CH_3)_3$ |
| A-163 | Methyltrimethoxysilane | $CH_3Si(OCH_3)_3$ |
| A-172 | Vinyl tris(2-methoxy-ethoxy)silane | $CH_2{=}CHSi(OC_2H_4OCH_3)_3$ |
| A-174 | gamma-Methacryloxy-propyltrimethoxysilane | |
| A-186 | beta-(3,4-Epoxycyclohexyl) ethyltrimethoxysilane | |
| A-187 | gamma-Glycidoxypropy-trimethoxysilane | |
| A-189 | gamma-Mercaptopropyl-trimethoxysilane | $HSCH_2CH_2CH_2Si(OCH_3)_3$ |
| A-1100 | gamma-Aminopropyl-triethoxysilane | $H_2NCH_2CH_2CH_2Si(OCH_2CH_3)_3$ |
| A-1111 | Hydroxy-functional silane | |
| A-1120 | N-beta-(Aminoethyl) gamma-aminopropyltrimethoxysilane | $H_2N(CH_2)_2NH(CH_2)_3Si(OCH_3)_3$ |
| A-1160 | Ureido-modified aminosilane | |
| A-1893 | gamma-Mercaptoethyltriethoxysilane | $HSCH_2CH_2Si(OCH_2CH_3)_3$ |
| | Amino-functional silane | |
| | Carbamate-functional silane | |
| | n-Octyltriethoxysilane | $CH_3(CH_2)_7Si(OCH_2CH_3)_3$ |

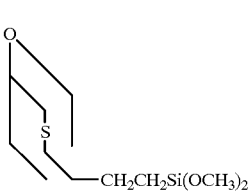

However, for the reinforcement of epoxy matrices, generally $R^1$ and $R^3$ selected from 3 gycidoxypropyl and $R^2$ and $R^4$ selected from ethyl moieties is generally preferred.

Accordingly, preferred diester-and triester-organosilanes are 3-glycidoxypropylmethyidiethoxysilane and 3-glycidoxypropyltrimethoxysilane, respectively. The combination of these coupling agents having been discovered to provide reinforced epoxy composites with greater strength than either of the two coupling agents used alone.

linked to resist hydrolysis and which will eventually fail upon exposure to a humid environment. As such, the blend of diol and triol may act to form an interphase that maximizes hydrolysis resistance and allows a higher performance level to be reached.

The diol-and triol-organosilanes are preferably included in the sizing composition in a total amount of from about 0.5 to 2.0 weight percent, more preferably, about 1.0 weight percent, of the sizing composition. Of this total, preferably from about 25 to 75 weight percent, more preferably 40 to 60 weight percent, is diol-organosilane. In a particularly preferred embodiment, approximately equal weights of diol- and triol-organosilanes are included in the sizing composition.

The advantages provided by the use of glass fibers coated with the sizing composition of the invention for the reinforcement of epoxy composites are illustrated in the examples below.

EXAMPLES

1. Preparation of Sizing Compositions.

Sizing compositions were prepared by first forming a premix of the coupling agents by combining and mixing citric acid, 3-glycidoxypropyltrimethoxysilane (3-GPTMS), 3-glycidoxypropylmethyldiethoxysilane (3-GPMDES) and water. To this premix, an aqueous emulsion of DER 337 DA90, an epoxy resin commercially available from the DOW Chemical Company having an epoxy equivalent weight of 230 to 250, (AD502) was added. Thereafter, polyethyleneglycol 400 monooleate, obtained from Henkel (Emerest 2646), polyethylene imine alkylamide obtained from Henkel (EMERY 6760U lubricant) and mono-pentaerydiritol obtained from Hercules (Aqualon) were sequentially added to the premix in the above order to provide the sizing compositions 1–6 shown below in Table 1 on a weight percentage basis.

TABLE 1

| Sample No. | 1 | 2 | 3 | 4 | 5 | 6 |
|---|---|---|---|---|---|---|
| AD502 | 6.86 | 6.81 | 6.85 | 6.62 | 6.75 | 6.54 |
| Citric Acid | 0.03 | 0.03 | 0.03 | 0.03 | 0.03 | 0.03 |
| PEG400MO | 1.07 | 1.07 | 1.07 | 1.03 | 1.05 | 1.02 |
| EMERY 6760U | 0.07 | 0.17 | 0.17 | 0.16 | 0.17 | 0.16 |
| MONO PE | 0.09 | 0.09 | 0.09 | 0.09 | 0.09 | 0.09 |
| (3-GPTMS) | 0.63 | 0.31 | — | 0.61 | 0.42 | 0.21 |
| (3-GPMDES) | — | 0.31 | 0.63 | — | 0.22 | 0.39 |
| Mix solids, % | 5.50 | 5.50 | 5.50 | 5.34 | 5.45 | 5.27 |

2. Preparation of Sized Glass Fiber for Reinforcement of Epoxy Pipe.

The sizing compositions were applied to conventional E-glass fibers by passing them over an applicator roll during strand formation. The sizing application rate in terms of strand solids and yardage is shown below in Table 2. The sized fibers were formed into strands, wound into packages, and dried in an oven at approximately 265° F. for from 6 to 12 hours.

TABLE 2

| Sample No. | 1 | 2 | 3 | 4 | 5 | 6 |
|---|---|---|---|---|---|---|
| Strand Solids, % | 0.56 | 0.64 | 0.67 | 0.61 | 0.64 | 0.63 |
| Yardage Yds/Lb | 503 | 456 | 457 | 476 | 473 | 471 |

3. Preparation of Reinforced Epoxy Pipe.

The sized strands were unwound from the packages, passed through breaker bars to separate the strand filaments, and passed through a reservoir containing 53.7 weight percent DER 331 epoxy resin commercially available from the Dow Chemical Company; 45.7 weight percent Lindride 66K catalyst obtained from Lindow Chemical; 0.3 weight percent AP6G curing agent available from Dixie Chemical, and 0.22 weight percent Modaflow commercially available from Monsanto, to coat the roving with the resin composition. The excess epoxy resin was removed from the strand with a squeegee, and the epoxy coated strand was helically wound on a mandrel approximately 2.25 inches in diameter and 12 feet in length. The strand was wound on the mandrel at a speed of approximately 100 ft/min and under a tension of approximately 2 to 10 lbs. After 3 layers of the strand had been wound over the mandrel, the epoxy was cured by passing steam through the interior of the mandrel. After curing, the resulting pipe was removed from the mandrel and cut into segments approximately 22 inches in length for testing. The ends of each segment was sealed with leakproof metal caps and the fatigue life of the pipe segments was tested according to ASTM D2143. Each pipe section was fitted on the outside of the pipe with three electrical detectors to sense the presence of water The pipes were filled with water and mounted on a cyclic fatigue tester. Cyclic fatigue was determined by cynically fluctuating the internal pressure on the pipe segment between 0 and a designated elevated pressure (600 psi and 1500 psi) and noting the number of cycles the pipe withstood before weeping occurred.

The number of cycles for water to penetrate to the outer wall of the pipe was measured by each detector. After all the detectors failed, an average number of cycles was taken for each pipe section. The pipe section's minimum wall thickness was determined according to ASTM D-2992. The pressures, minimum pipe wall thicknesses and pipe diameters were used to calculate hoop stress according to the following equation:

$$\text{Hoop Stress} = \frac{\text{Pressure} \times \text{Pipe Diameter}}{2 \times \text{Pipe Wall Thickness}}$$

The hoop stress is defined as the tensile stress in the wall of the piping product in the circumferential direction due to internal pressure. The linear regression of the logarithm of the hoop stress versus the logarithm of number of cycles was used to calculate the number of cydes to weep at a hoop stress of 131 MPa (19,000 psi), a commonly accepted method for reporting fatigue life in the art of continuous fiber reinforced pipe.

Additionally, the burst strength of the pipe segments was determined by raising the internal pressure in a pipe sample until it leaks or bursts. Four samples of each pipe were tested, and the mode of failure and average pressure of failure are indicated below.

The results of these tests are set forth below in Table 3.

TABLE 3

| | Anhydride epoxy pipe results: | | | | | |
|---|---|---|---|---|---|---|
| Sample No. | 1 | 2 | 3 | 4 | 5 | 6 |
| | BURST RESULTS | | | | | |
| Burst Pressure, PSI | 3468 | 4617 | 3530 | 3400 | 4128 | 4200 |
| Min. Wall, MILS | 50.3 | 55.4 | 57.0 | 50.6 | 49.8 | 53.0 |
| Hoop Stress, PSI | 78,781 | 95,786 | 70.972 | 76,931 | 94,651 | 90,683 |
| Glass Content, % | 78.2 | 77.0 | 77.0 | 76.9 | 79.0 | 77.3 |
| Failure Mode | 4-Weep | 4-Burst | 4-Weep | 4-Weep | 3-Weep 1-Burst | 1-Weep 3-Burst |
| | CYCLIC RESULTS | | | | | |
| Cycles @ 1500 PSI | 672 | 1186 | 583 | 524 | 1034 | 1522 |
| Cycles @ 600 PSI | 50,409 | 131,322 | 98,497 | 52,992 | 119,448 | 136,466 |
| $r^2$ | 0.988 | 0.994 | 0.993 | 0.996 | 0.993 | 0.976 |
| Slope | −0.211 | −0.194 | −0.180 | −0.201 | −0.199 | −0.200 |
| Cycles @ 19000 Hoop Strength | 11,214 | 15,527 | 8,796 | 8,708 | 18,670 | 18,348 |

What is claimed is:

1. A glass fiber sizing composition comprising at least one diol-organosilane and at least one triol-organosilane wherein said triol-organosilane is the hydrozylate of a triester organosilane of the formula $R^1$—$Si(OR^2)_3$ wherein $R^1$ is selected from a phenyl group or a saturated or unsaturated alkyl group having from 1 to 10 carbon atoms, optionally substituted with a halide, methacryloxy, cycloalkylepoxy, epoxy ester, mercapto, amino, ureido or carbamate moiety; and $R^2$ is selected from a methyl, ethyl, 2-methoxy-ethyl, isopropyl, n-propyl or n-butyl moiety; and wherein said diol-organosilane is the hydrozylate of a diester-organosilane of the formula $R^3$—$Si(CH_3)(OR^4)_2$ wherein $R^3$ is selected from a phenyl group or a saturated or unsaturated alkyl group having from 1 to 10 carbon atoms, optionally substituted with a halide, methacryloxy, cycloalkylepoxy, epoxy ester, mercapto, amino, ureido or carbamate moiety; and $R^4$ is selected from a methyl, ethyl, 2-methoxy-ethyl, isopropyl, n-propyl or n-butyl moiety.

2. The sizing composition of claim 1, wherein $R^1$ and $R^3$ are independently selected from methyl, vinyl, chloropropyl, phenyl, methacrylyloxy-propyl, beta-(3,4-epoxycyclohexyl)ethyl, glycidoxy propyl, mercaptopropyl, aminopropyl, N-beta-(aminoethyl) aminopropyl, mercaptoethyl, n-Octyl, $(HOC_2H_4)_2NH(CH_2)_3$, $H_2NCONH(CH_2)_3$, $H_2N(CH_2)_2NH(CH_2)_2NH(CH_2)_3$ and $R^2$ and $R^4$ are independently selected from methyl and ethyl moities.

3. The sizing composition of claim 2, wherein said triester-organosilane is 3-glycidoxypropyltrimethoxysilane.

4. The sizing composition of claim 3, wherein said diester-organosilane is 3-glycidoxypropylmethyidiethoxysilane.

5. A glass fiber coated with the sizing composition of claim 4.

6. The sizing composition of claim 2, wherein said diol-organosilane is a compound of the formula $R^1SiCH_3(OH)_2$ and said triol-organosilane is a compound of the formula $R^3Si(OH)_3$.

7. The sizing composition of claim 6, wherein said diol-organosilane is 3-glycidoxypropylmethyidihydroxysilane and said triol-organosilane is 3-glycidoxypropyltrihydroxysilane.

8. The sizing composition of claim 2, wherein said diol-organosilanes comprise from about 25 to about 75 percent by weight of the total diol- and triol-organosilane compounds contained in the composition.

9. The sizing composition of claim 8, wherein said diol-organosilanes comprise from about 40 to about 60 percent by weight of the total diol- and triol-organosilanes.

10. A glass fiber coated with the sizing composition of claim 1.

11. A glass fiber reinforced composite comprising an epoxy matrix and glass fibers coated with a sizing composition containing a triol-organosilane hydrozylate of a triester-organosilane of the formula $R^1$—$Si(OR^2)_3$ and a diol-organosilane hydrozylate of a diester-organosilane of the formula $R^3$—$Si(CH_3)(OR^4)_2$, wherein $R^1$ and $R^3$ are independently selected from a phenyl group or a saturated or unsaturated alkyl group having from 1 to 10 carbon atoms, optionally substituted with a halide, methacryloxy, cycloalkylepoxy, epoxy ester, mercapto, amino, ureido or carbamate moiety, and $R^2$ and $R^4$ are independently selected from a methyl, ethyl, 2-methoxy-ethyl, isopropyl, n-propyl or n-butyl moiety.

12. The glass fiber reinforced composite of claim 11, wherein $R^1$ and $R^3$ are independently selected from methyl, vinyl, chloropropyl, phenyl, methacrylyloxy-propyl, beta-(3,4-epoxycyclohexyl)ethyl, glycidoxy propyl, mercaptopropyl, aminopropyl, N-beta-(aminoethyl) aminopropyl, mercaptoethyl, n-Octyl, $(HOC_2H_4)_2NH(CH_2)_3$, $H_2NCONH(CH_2)_3$, $H_2N(CH_2)_2NH(CH_2)_2NH(CH_2)_3$ and $C_2H_5OCONHCH_2CH_2CH_2$; and $R^2$ and $R^4$ are independently selected from methyl and ethyl moieties.

13. The glass fiber reinforced composite of claim 12, wherein said diester-organosilane is 3glycidoxypropylmethyldiethoxysilane.

14. The glass fiber reinforced composite of claim 13, wherein said triester-organosilane is 3-glycidoxypropyltrimethoxysilane.

* * * * *

UNITED STATES PATENT AND TRADEMARK OFFICE
CERTIFICATE OF CORRECTION

PATENT NO. : 6,270,897 B1  
DATED : August 7, 2001  
INVENTOR(S) : Flautt et al.

It is certified that error appears in the above-identified patent and that said Letters Patent is hereby corrected as shown below:

Column 7,
Line 50, should read -- $(CH_2)_2NH(CH_2)_3$ and $C_2H_5OCONHCH_2CH_2CH_2$; and $R^2$ and $R^4$ are independently selected
Line 56, should read -- 3-glycidoxypropylmethyldiethoxysilane. --

Column 8,
Line 23, should read -- 3-glycidoxypropylmethyldihydroxysilane and said triol- --

Signed and Sealed this

Sixteenth Day of April, 2002

Attest:

Attesting Officer

JAMES E. ROGAN
*Director of the United States Patent and Trademark Office*